United States Patent
Doany et al.

(10) Patent No.: US 9,322,987 B2
(45) Date of Patent: Apr. 26, 2016

(54) MULTICORE FIBER COUPLER BETWEEN MULTICORE FIBERS AND OPTICAL WAVEGUIDES

(71) Applicant: International Business Machines Corporation, Armonk, NY (US)

(72) Inventors: Fuad Doany, Katonah, NY (US); Daniel M. Kuchta, Patterson, NY (US); Petar K. Pepeljugoski, Tarrytown, NY (US); Laurent Schares, Luxembourg (LU)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 14/011,381

(22) Filed: Aug. 27, 2013

(65) Prior Publication Data

US 2015/0063755 A1  Mar. 5, 2015

(51) Int. Cl.
G02B 6/02 (2006.01)
G02B 6/42 (2006.01)
G02B 6/36 (2006.01)

(52) U.S. Cl.
CPC ............ G02B 6/02042 (2013.01); G02B 6/425 (2013.01); *G02B 6/3652* (2013.01); *G02B 6/423* (2013.01); *G02B 6/4214* (2013.01); *Y10T 29/49826* (2015.01)

(58) Field of Classification Search
CPC ...... G02B 6/2852; G02B 6/2817; G02B 6/30; G02B 6/125; G02B 5/423; G02B 6/3636
USPC ............................................. 385/48–59, 147
See application file for complete search history.

(56) References Cited

U.S. PATENT DOCUMENTS

| 3,823,996 A | 7/1974 | Kompfner et al. |
| 4,834,484 A * | 5/1989 | Gorman et al. ................. 385/26 |
| 5,408,551 A * | 4/1995 | Maria van Woesik .......... 385/28 |
| 6,078,708 A | 6/2000 | de la Tocnay et al. |
| 6,343,171 B1 * | 1/2002 | Yoshimura ......... G02B 6/12002 257/E23.01 |
| 6,577,420 B1 | 6/2003 | Ford et al. |
| 6,659,654 B2 | 12/2003 | Kao |
| 6,711,315 B1 * | 3/2004 | Joseph ................. G02B 6/3556 385/17 |
| 6,845,184 B1 * | 1/2005 | Yoshimura ......... G02B 6/12002 257/E23.01 |
| 7,044,655 B2 * | 5/2006 | Kato et al. ....................... 385/89 |

(Continued)

FOREIGN PATENT DOCUMENTS

| CN | 102016672 A | 4/2011 |
| JP | 2002-277675 A | 9/2002 |

(Continued)

OTHER PUBLICATIONS

"Connectorized Optical Link Package Incorporating a Microlens" Johnson, B.; Ackenhusen, J.; Lorimor, O.; Components, Hybrids, and Manufacturing Technology, IEEE Transactions on vol. 3, Issue: 4, Publication Year: 1980, pp. 488-492.

(Continued)

*Primary Examiner* — Akm Enayet Ullah
(74) *Attorney, Agent, or Firm* — Daniel P. Morris; McGinn IP Law Group LLC

(57) ABSTRACT

An optical connector includes a fiber element incorporating one or more optical fibers, the optical fiber including a plurality of cores, and an optical element including an array of optical waveguides arranged in one or more layers so as to match the geometry of the plurality of cores of the optical fiber.

12 Claims, 19 Drawing Sheets

(56) References Cited

U.S. PATENT DOCUMENTS

| | | | |
|---|---|---|---|
| 7,123,809 | B2 | 10/2006 | Yamamoto et al. |
| 7,136,551 | B2 | 11/2006 | Cho et al. |
| 7,221,829 | B2 | 5/2007 | Oono et al. |
| 7,269,321 | B2 | 9/2007 | Morris et al. |
| 7,343,068 | B2 | 3/2008 | Shigenaga et al. |
| 7,613,371 | B2 * | 11/2009 | Ankerhold ............ 385/25 |
| 7,654,751 | B2 | 2/2010 | Althaus et al. |
| 7,693,362 | B2 | 4/2010 | Fenwick et al. |
| 8,467,061 | B2 * | 6/2013 | McCaffrey ...... B01L 3/502707 356/318 |
| 8,994,946 | B2 * | 3/2015 | McCaffrey ........ C12Q 1/6869 356/318 |
| 9,069,143 | B2 | 6/2015 | Bradley et al. |
| 2007/0047875 | A1 | 3/2007 | Sezerman et al. |
| 2008/0226228 | A1 | 9/2008 | Tamura et al. |
| 2008/0310799 | A1 | 12/2008 | Jacobowitz et al. |
| 2009/0154884 | A1 | 6/2009 | Chen et al. |
| 2011/0129231 | A1 | 6/2011 | Fiorentino |

FOREIGN PATENT DOCUMENTS

| | | |
|---|---|---|
| JP | 2006-301415 A | 11/2006 |
| JP | 2008-020719 A | 1/2008 |
| WO | WO 01/27669 A1 | 4/2001 |

OTHER PUBLICATIONS

"Design rules for highly parallel free-Space optical interconnects" Kirk, A.G.; Plant, D.V.; Ayliffe, M.H.; Chateauneuf, M.; Lacroix, F.; Selected Topics in Quantum Electronics, IEEE Journal of vol. 9, Issue: 2, Publication Year: 2003, pp. 531-547.

"Novel Releasable Multi-Fiber Optical Connectivity Solution for Optical Communication using V-Grooves and Micro-Lens Arrays" Kunde, J.; Pliska, A.C.; Krasnopolski, K.; Grossmann, S.; Bosshard, Ch.; Bauknecht, R.; Soufiane, A.; Krahenbuhl, R.; Zaina, P.; Ammer, T.; Peterhans, A.; Electronics Systemintegration Technology Conference, 2006. 1st vol. 1, Publication Year: 2006, pp. 268-27.

"Integration of micro-optics with a fiber array connector using passive alignment technique for parallel optics applications" Han, H.; Morris, J.; Fedor, A.; Su, B.; Aichele, D.; Chen, E.; Weathersbee, H.; Semakov, A.; Electronic Components and Technology Conference, 2004. Proceedings. 54th vol. 1, Publication Year: 2004, pp. 1012-1015 vol. 1.

* cited by examiner

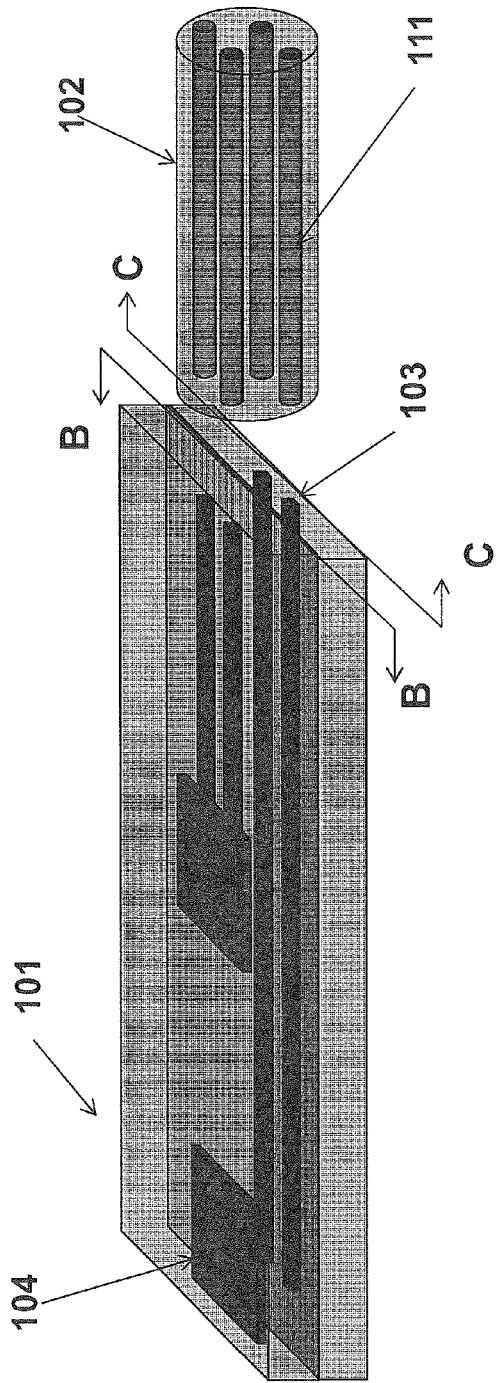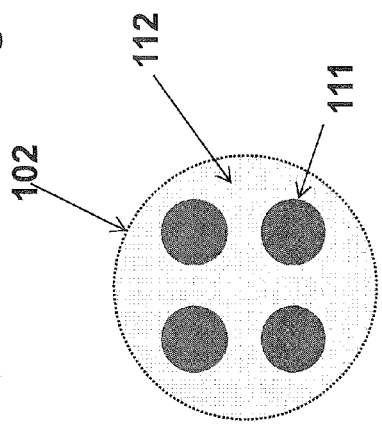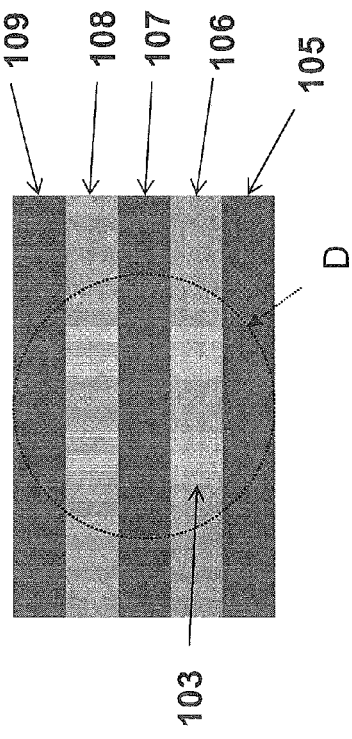

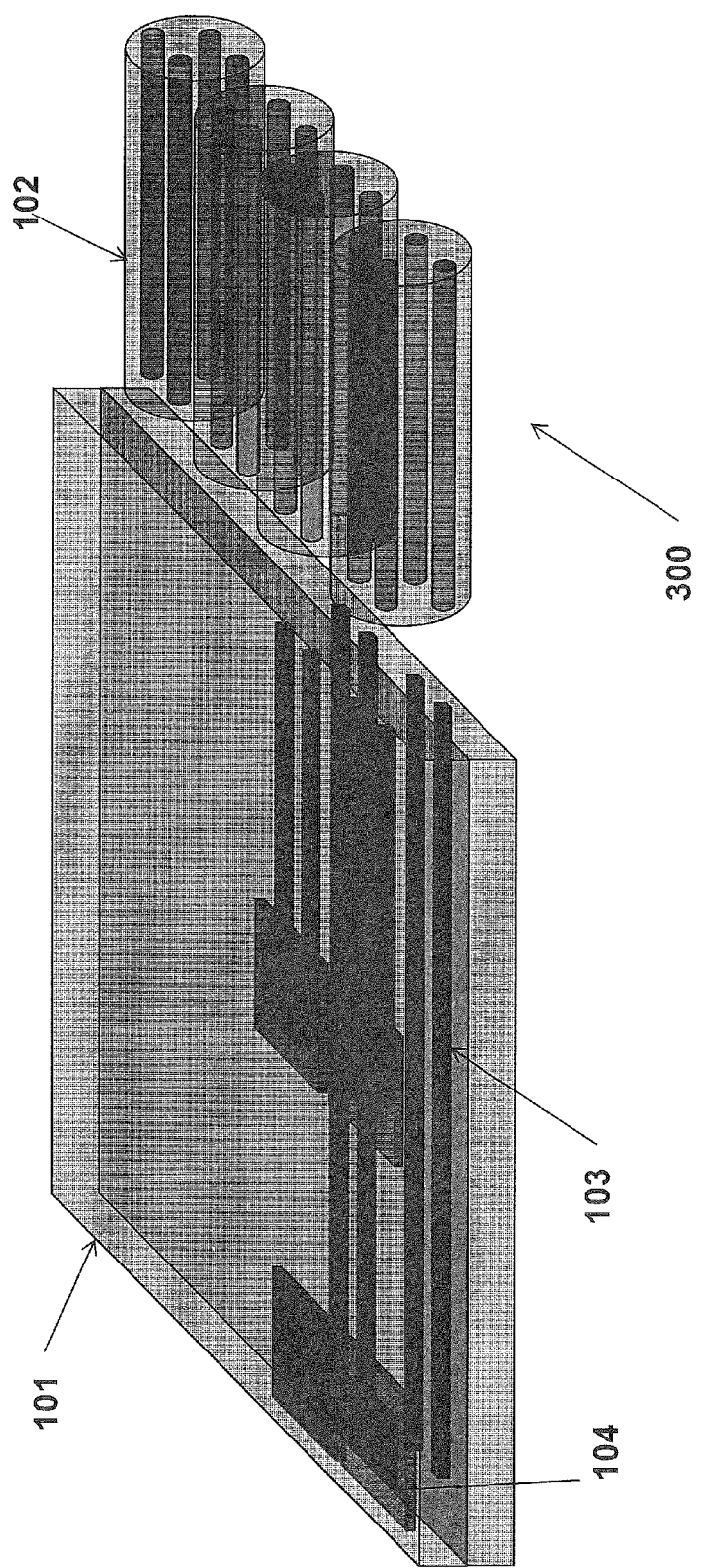

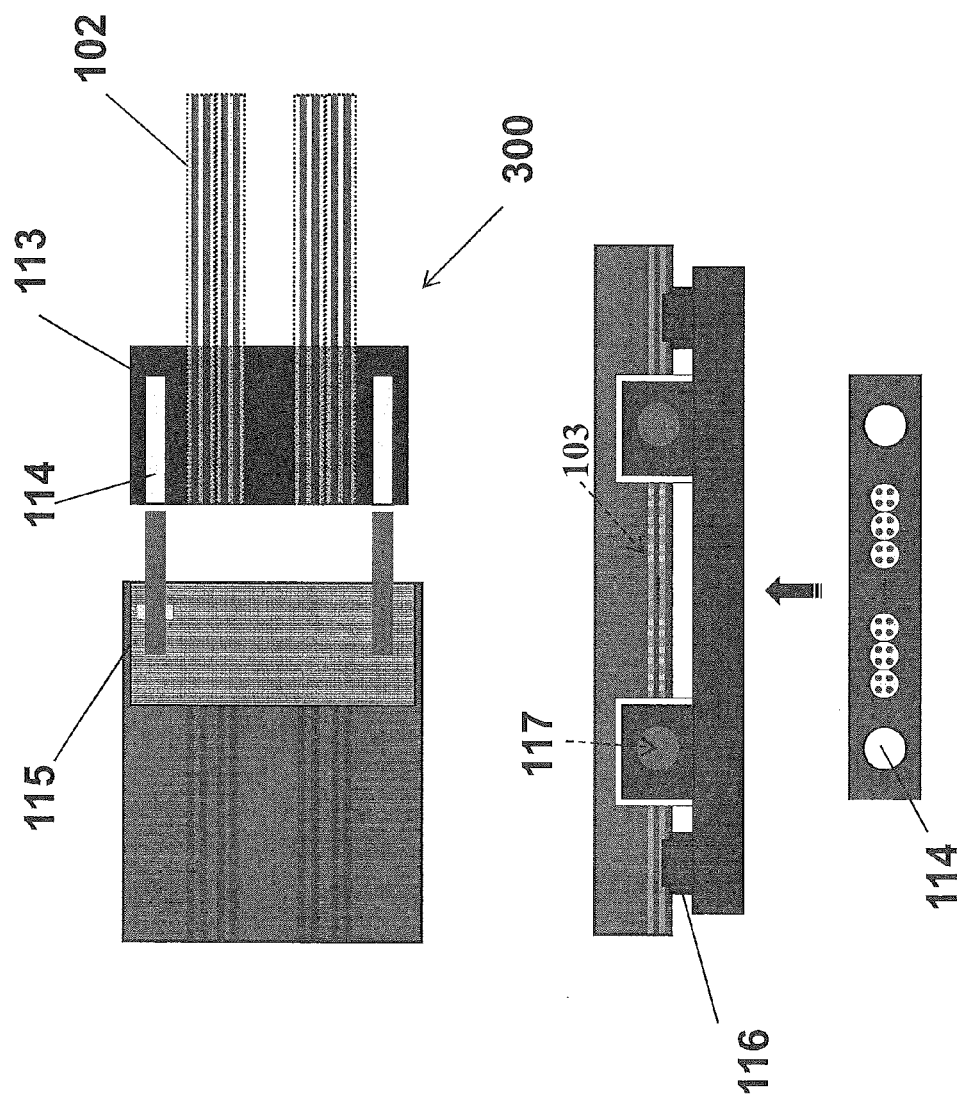

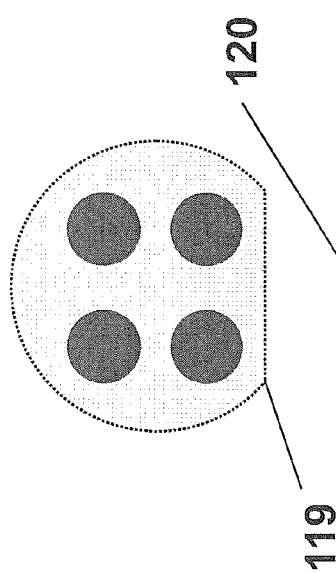
Figure 4A1
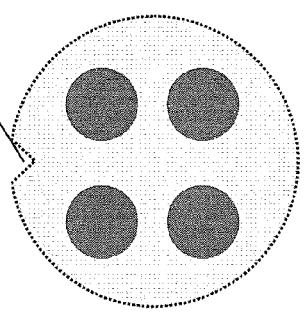
Figure 4A2
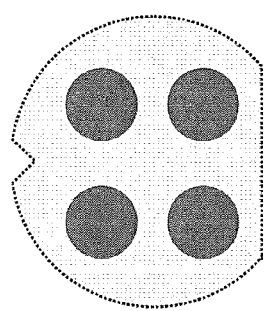
Figure 4A3

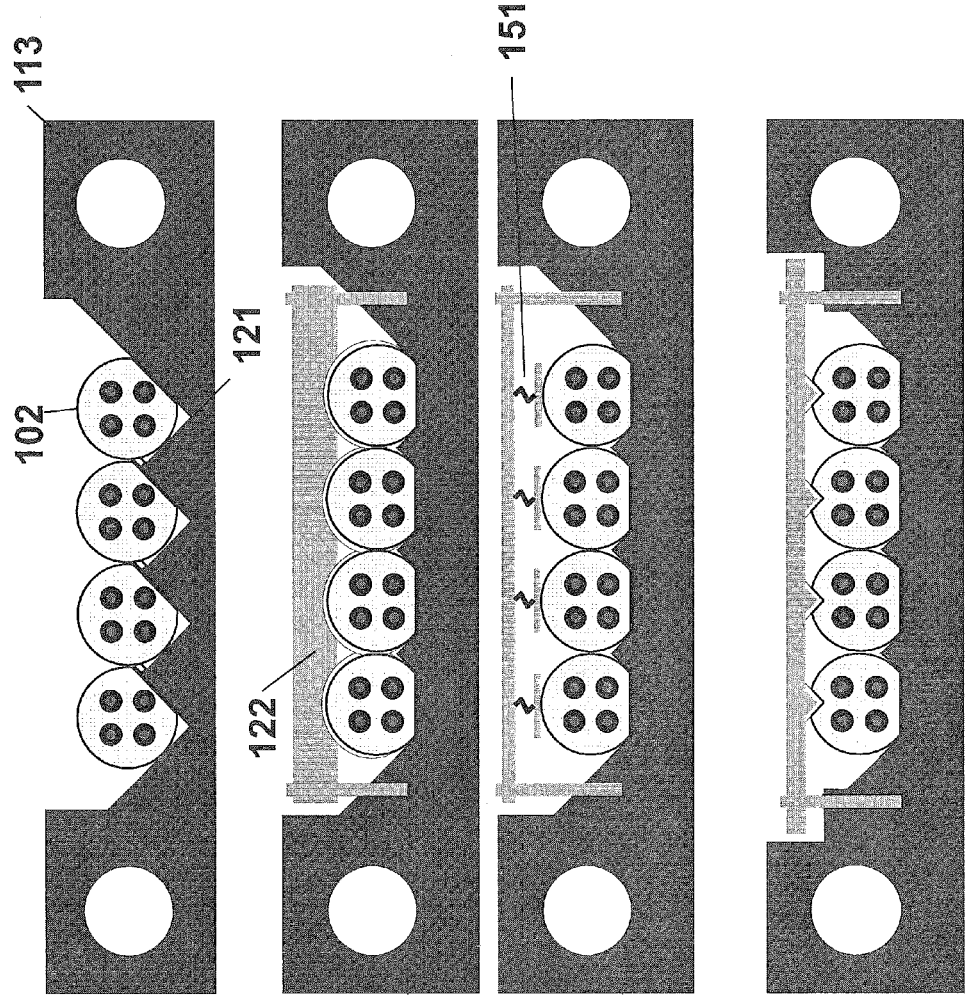
Figure 4B1  Figure 4B2  Figure 4B3  Figure 4B4

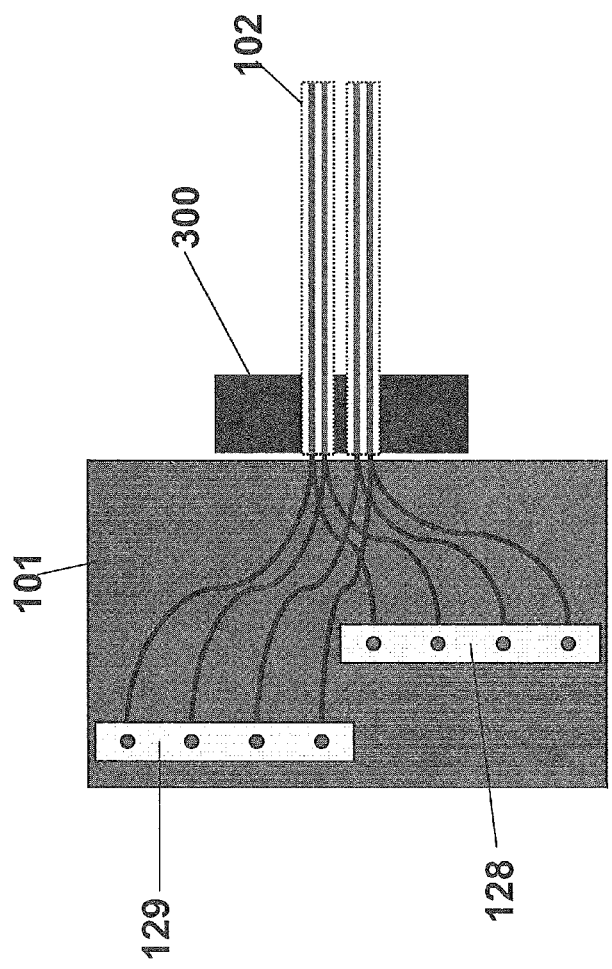
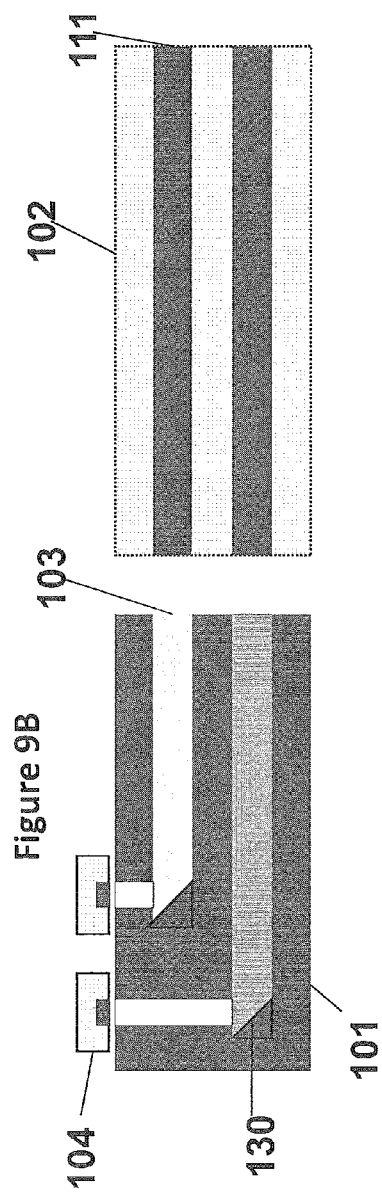
Figure 9A
Figure 9B

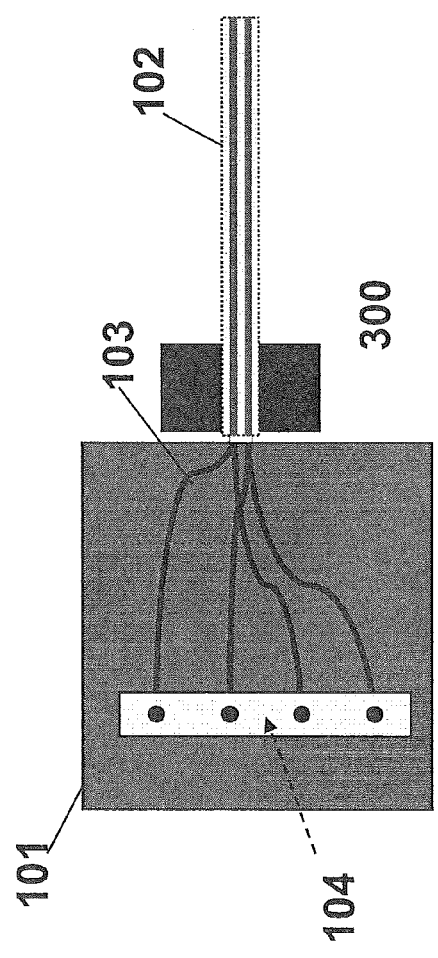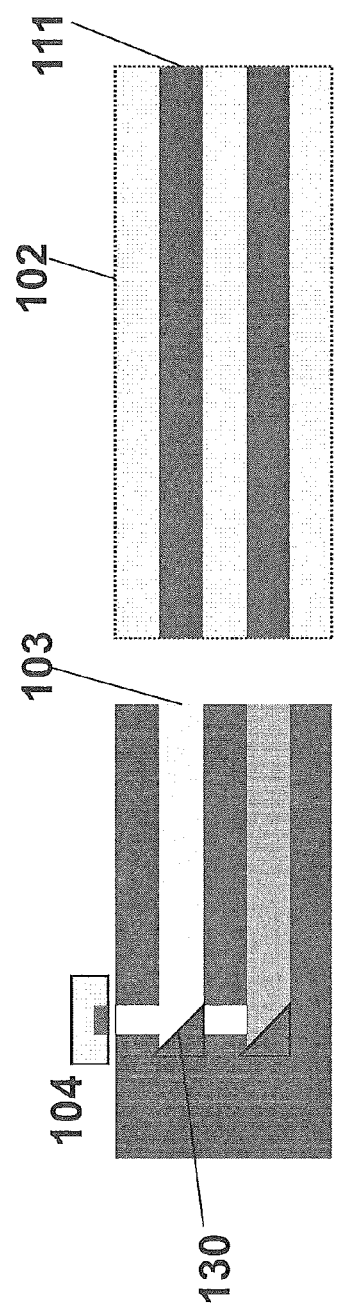
Figure 10A
Figure 10B

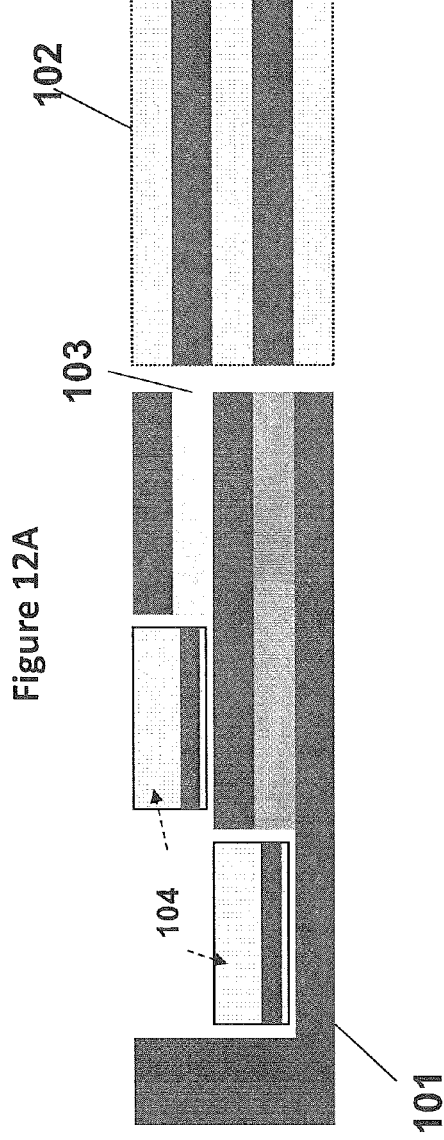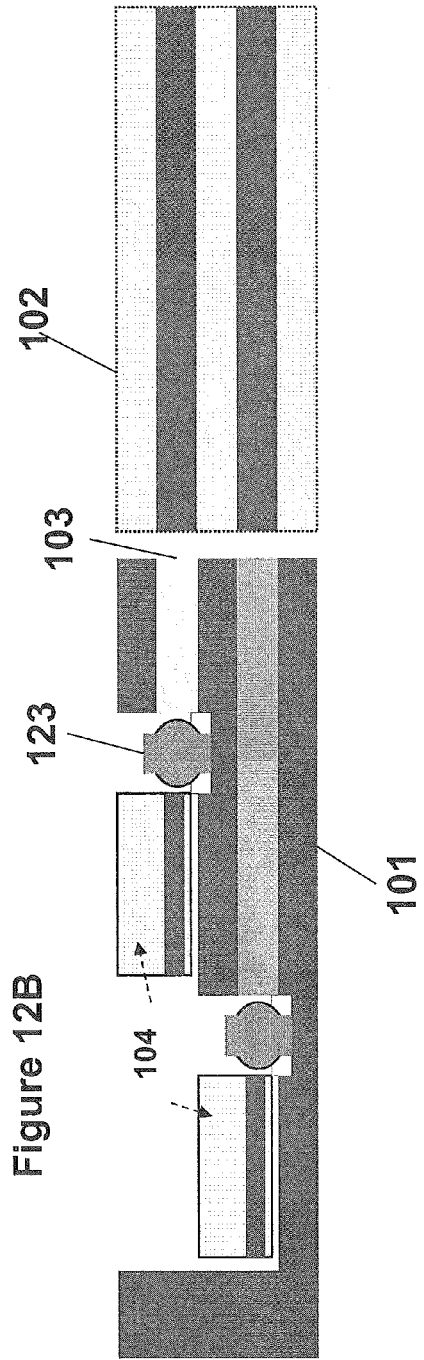

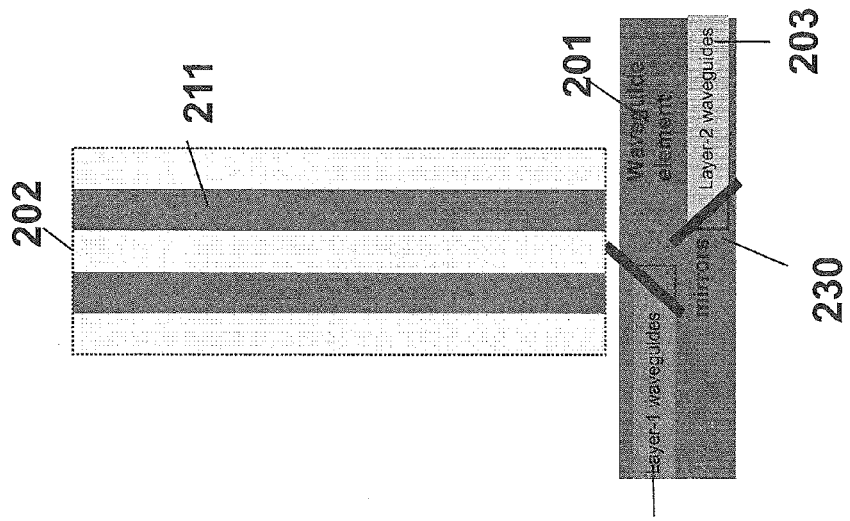
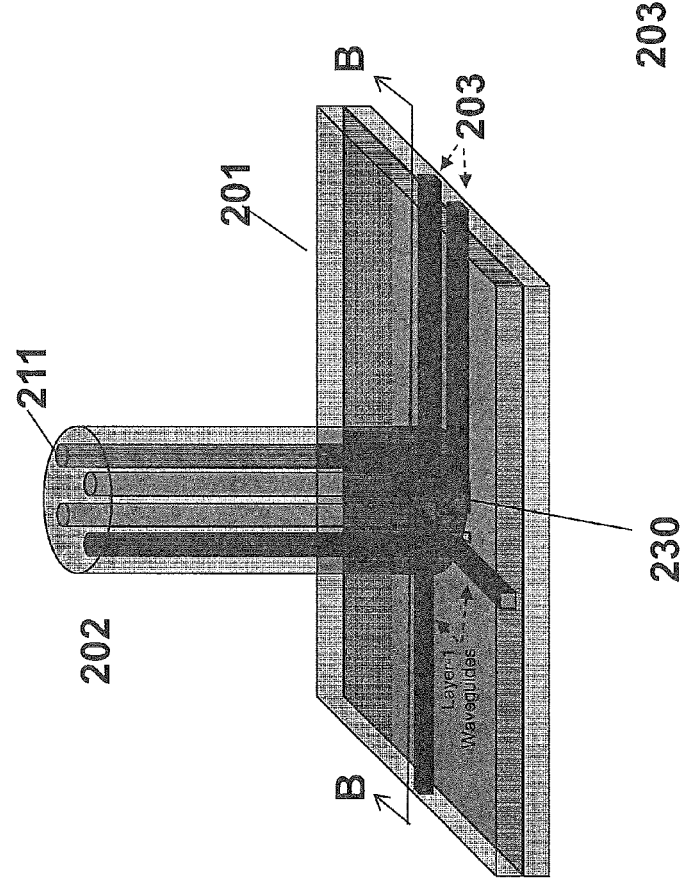
Figure 17A
Figure 17B

Top view:

MULTICORE FIBER COUPLER BETWEEN MULTICORE FIBERS AND OPTICAL WAVEGUIDES

STATEMENT REGARDING FEDERALLY SPONSORED RESEARCH AND DEVELOPMENT

The invention disclosed herein was made with U.S. Government support under Contract No. H98230-07-C-0409 awarded by the National Security Agency. The Government has certain rights in this invention.

BACKGROUND OF THE INVENTION

1. Field of the Invention

The present invention relates generally to fiber optic interconnections. This invention relates in particular to coupling light between multicore fibers and elements with optical waveguides.

2. Description of the Related Art

Multicore fibers have a multitude of cores embedded in a common cladding. As such, they can transport more bandwidth per fiber than standard fibers with a single core and hence lead to a potential cost reduction. Multicore fibers have been cited in the literature as early as 1979 and various newer types of multimode and single-mode multicore fibers have been proposed over the years, but they have to date not been a major commercial success. This is largely due to the absence of a simple and low-cost optical connector to couple between multicore fibers or between optoelectronic elements and multicore fibers. Therefore, a need exists for a low cost method to couple light to and from multicore fibers.

Drawbacks of existing schemes to couple between optoelectronic devices and multicore fibers are discussed below. Some coupling schemes use either butt coupling or a two-lens optical relay. Custom optoelectronic device arrays (lasers, photodiodes) are required that match exactly the geometry of the multicore fiber. Rotational alignment is critical and has not been successfully addressed in a passive alignment process. Active alignment of each individual fiber would be costly. Using two-lens optical relays, efficient coupling could be possible, but density between neighboring fibers (typically 125-250-µm diameter) is limited, thereby giving up some of the advantage of multicore fibers. Optical crosstalk is a concern as the fiber cores are typically spaced by only 30-40 µm. Apertures may help to avoid crosstalk, but at the expense of higher insertion loss.

Several connector concepts have been proposed to couple light from a multicore fiber into multiple single core fibers. All of these concepts achieve coupling of light and rotational alignment between a multicore fiber and several single core fibers, either through a mechanical fixture or through splicing. However, none of these concepts demonstrates coupling between multicore fibers and optical waveguides.

Another concept describes active fiber alignment, using a light source at an input of a multicore fiber and a light detector at an output. However, coupling multicore fibers to optical waveguides is not disclosed. Also, this concept involves active fiber alignment, based on active rotation (and optional translation) of the fiber for the highest signal at the detector. Unlike passive alignment, active alignment of multicore fibers is a time-consuming and costly process that is unsuitable for high-volume applications demanding ultra-low cost connections.

Another related art includes a method for connecting a multicore fiber to optical devices. However, this is also an active fiber alignment device and no means for passive rotational fiber alignment is described. Also, coupling to optical waveguide elements is not disclosed, and the fiber type described in this work is a photonic crystal fiber, which is a very specific sub-type of multicore fibers with limited applications.

Other related art describes a multicore fiber coupling system which supports use of coupling to an optical waveguide. This related art describes a modulated ring laser coupled to a fiber using an intermediate waveguide. It envisions coupling to a multicore fiber, but only out of plane.

In-plane coupling between waveguide substrate and fiber ribbons is described by another related art. However, in-plane coupling is limited to a substrate with a single plane. That is, coupling between a substrate with a single layer of waveguides and an optical fiber ribbon. Also, no active or passive means for alignment of the multicore fiber to the substrate with waveguides is described.

SUMMARY OF THE INVENTION

In view of the foregoing, and other, exemplary problems, drawbacks, and disadvantages of the conventional systems, it is an exemplary feature of the present invention to provide coupling of an optical waveguide to a multicore fiber.

It is, therefore, an exemplary feature of the present invention to provide a method and device for coupling light in and out of a multicore fiber.

An exemplary aspect of the invention is embodied as an optical connector including a fiber element incorporating one or more optical fibers, the optical fiber including a plurality of cores, and an optical element including an array of optical waveguides arranged in one or more layers so as to match the geometry of the plurality of cores of the optical fiber.

An exemplary method of coupling a fiber element to one or more optoelectronic elements includes providing a fiber element incorporating one or more optical fibers, the optical fiber including a plurality of cores, providing an optical element comprising an array of optical waveguides arranged in one or more layers such that a geometry of the optical waveguides matches a geometry of the plurality of cores of the optical fiber, coupling optoelectronic elements with the optical element, and coupling the fiber element to the optical element.

The above exemplary embodiment of the invention may provide a simple and low-cost optical connector to couple between multicore fibers or between optoelectronic elements and multicore fibers.

BRIEF DESCRIPTION OF THE DRAWINGS

The foregoing and other purposes, aspects and advantages will be better understood from the following detailed description of exemplary embodiments of the invention with reference to the drawings, in which:

FIG. 1A illustrates an exemplary optical coupler between an exemplary multicore fiber and an exemplary element containing two layers with optical waveguides, according to an embodiment of the present disclosure. In one exemplary embodiment, the optical waveguide element may be used as an intermediate coupling element to connect optoelectronic elements to multicore fibers;

FIGS. 1B and 1C illustrate cross-sections of the embodiment of FIG. 1A;

FIG. 2 illustrates an exemplary fiber element containing a multitude of multicore fibers coupled to an exemplary optical element with two layers of optical waveguides according to an embodiment of the present disclosure;

FIG. 3A illustrates an exemplary embodiment of a fiber connector with multiple multicore fibers connected to an optical waveguide element. A mechanical alignment means between the fiber and waveguide elements is illustrated;

FIG. 3B is a cross-section of the embodiment of FIG. 3A;

FIGS. 4A1-4A3 illustrate exemplary embodiments of multicore fibers with an asymmetry;

FIGS. 4B1-4B4 illustrates exemplary embodiments of passive rotational and translational alignment of multicore fibers in a parallel fiber connector element;

FIGS. 9A-B illustrate exemplary coupling between one or more optoelectronic elements and a multicore fiber element having different pitches, using the waveguide coupling element for pitch conversion;

FIGS. 10A-B show exemplary coupling between an optoelectronic array element and a multicore fiber element having different pitches, using the waveguide coupling element for pitch conversion;

FIGS. 12A-12B show exemplary coupling between one or more optoelectronic elements and a multicore fiber element, using the waveguide element for in-plane coupling between optoelectronic elements and multicore fibers. One or more lens elements may be used for coupling between the optoelectronic elements and the waveguide element;

FIGS. 17A-17B illustrate exemplary out-of-plane coupling between a multicore fiber element and an optical waveguide element with multiple waveguide layers;

DETAILED DESCRIPTION OF EXEMPLARY EMBODIMENTS OF THE INVENTION

Figure 5:
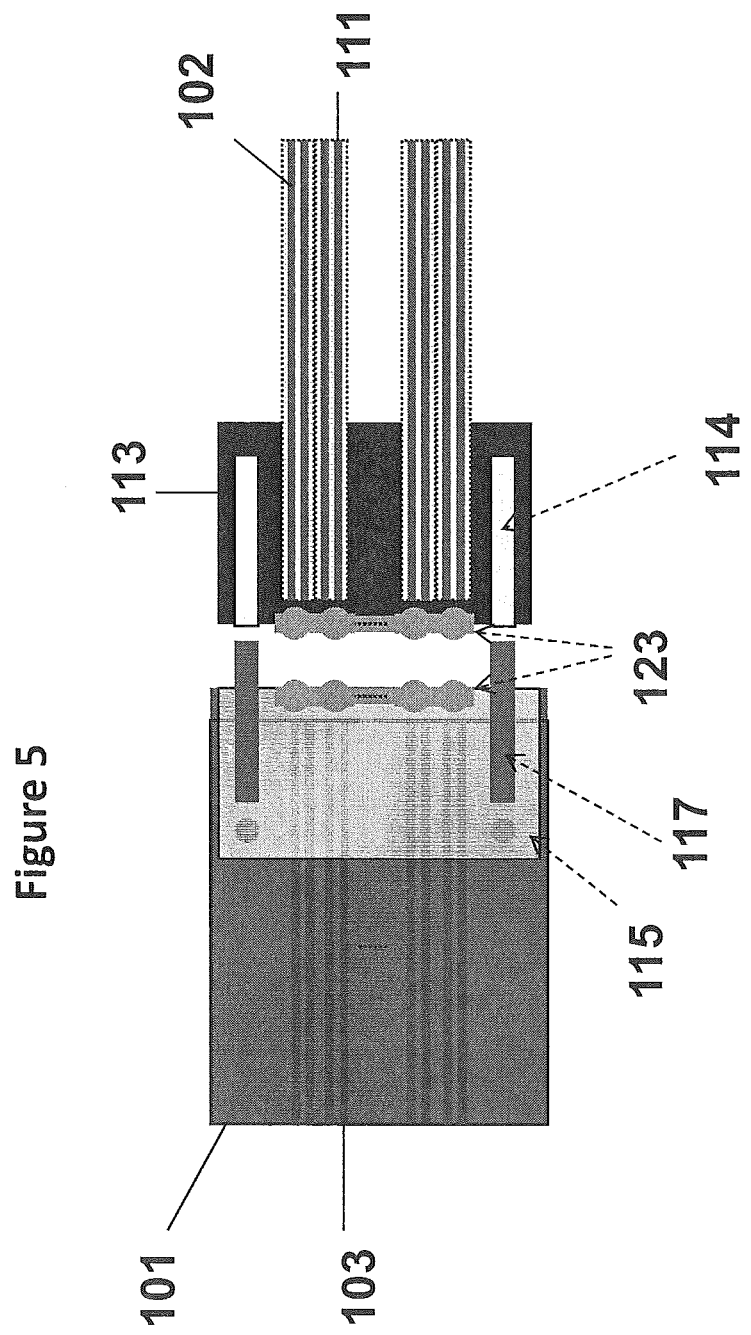
FIG. 5 illustrates an exemplary embodiment of a fiber connector with multiple multicore fibers connected to an optical waveguide element. A mechanical alignment means between the fiber and waveguide elements is illustrated, and one or more lens elements are included for coupling between the two elements.

In an exemplary embodiment, coupling an optical waveguide element to a multicore fiber can be applied as follows. A waveguide element can be used as intermediate coupling element to connect optoelectronic devices to multicore fibers. Exemplary optical waveguides may be integrated in various substrates, such as polymer waveguides on a printed circuit board or flex substrate.

Exemplary embodiments of the invention also apply to optical waveguides integrated on a glass or semiconductor carrier, and a chip or chip stack, such as in silicon nanophototonic technology.

Some exemplary embodiments of this invention incorporate waveguide elements with multiple layers of optical waveguides. Some exemplary embodiments of this invention include pitch conversion in the waveguide element, in order to decouple the layout of the optoelectronic devices from the layout of the multicore fiber. As a result, standard optoelectronic devices or device arrays can be used.

Some exemplary embodiments implement out-of-plane coupling by using waveguide elements with turning mirror or grating couplers. Rotational and translational multicore fiber alignment in a coupler or connector is based on fibers with an asymmetry, such as a D-shaped flange or a groove. Passive alignment can be obtained by matching this fiber asymmetry with a complementary structure on the waveguide element.

In exemplary embodiments, coupling between semiconductor chip(s) and multicore fiber (with single mode cores) can apply to Silicon Photonics or to a three-dimensional chip stack.

Referring now to the drawings, and more particularly to FIGS. 1A-18C, there are shown exemplary embodiments of the method and structures according to the present invention.

In an exemplary embodiment of the invention, a waveguide element 101 incorporating a multitude of optical waveguides 103 is used as an intermediate coupling element to connect optoelectronic devices 104 to one or more multicore fibers 102. FIG. 1A illustrates an exemplary optical coupling between a multicore fiber 102 and an element 101 containing two layers with optical waveguides 103. FIGS. 1B and 1C are cross-sections of the embodiment of FIG. 1A taken along the line B-B and C-C on the left and right, respectively. The multicore fiber 102 in this embodiment has 4 cores 111, arranged in a 2×2-array, embedded in a common fiber cladding 112 of lower refractive index than the refractive indices of the cores 111.

The optical waveguide element 101 in this embodiment has two layers of optical waveguides 103 embedded in a polymer substrate. The polymer substrate in this exemplary embodiment includes a lower cladding layer 105 a lower core layer 106, a middle cladding layer 107, an upper core layer 108 and an upper cladding layer 109. The lower, middle and upper cladding layer can have the same or different refractive indices. The refractive indices of the waveguides 103 in either core layer are higher than the refractive indices of neighboring cladding layers above and below. The vertical spacing of the two core layers in the waveguide element of an exemplary embodiment may be the same, within fabrication tolerances, as the spacing between two layers of two cores in the multicore fiber.

The multicore fiber is aligned rotationally and translationally to the edge of the waveguide coupling element, such that the 2×2 core array of the multicore fiber 102 matches the geometry of and overlaps with a 2×2 waveguide array of the waveguide element. A schematic overlay of multicore fiber 102 with regards to waveguide element 101 is represented by the dotted circle D. Following the alignment, optical light beams can then be coupled between the waveguides 103 and the corresponding cores 111 of the multicore fibers 102. The multicore fibers 102 may have cores 111 arranged on a regular or irregular pattern. The waveguides 103 on the waveguide element may have identical or different spacings in vertical and horizontal directions. The waveguides 103 may be routed arbitrarily on the waveguide element, but can be laid out such that their spacings at the edge of the waveguide element match the geometry of the cores 111 in the multicore fiber 102.

In an exemplary embodiment illustrated in FIG. 1A, the optical waveguide element 101 may be used as an intermediate coupling element to connect one or more optoelectronic elements 104 to one or more multicore fibers 102. Optoelectronic elements 104 in this exemplary embodiment may include singlets or arrays of lasers or photo detectors. The optoelectronic elements 104 are aligned and attached to the waveguide elements 103 such that light can be coupled between the two. The optoelectronic elements 104 can incorporate electronic chips or circuitry, forming transmitter, receiver or transceiver elements.

While not shown in FIGS. 1A-1C, optoelectronic elements are not limited to the variants described above, but can be based on a wide range of passive or active optical devices, including but not limited to, light emitting devices, optical switches, optical splitters, wavelength selective filters, optical multiplexers and demultiplexers.

FIG. 2 is a block diagram of an exemplary fiber element containing a multitude of multicore fibers 102, coupled to an exemplary optical element 101 with two layers of optical waveguides 103, according to an exemplary embodiment of the present disclosure. Multiple multicore fibers 102 can be grouped together in a single element, such as a fiber ribbon or a mechanical transfer ferrule (MT-ferrule) or similar. This parallel array of multicore fibers 102 is aligned to a waveguide element 103, with the number and layout of waveguides 103 corresponding to the number and layout of fiber cores 111.

Bandwidth density is a major advantage of using parallel arrays of fibers instead of single fibers, which has led to the widespread use of parallel optical interconnects in computing systems with high bandwidth requirements. Parallel arrays of multicore fibers 102 can enable connections with significantly higher bandwidth density than parallel arrays of single-core fibers.

Similarly to FIGS. 1A-B, the optical waveguide element 101 of FIG. 2 can serve as an intermediate optical coupling element between one or more optoelectronic elements 104 and between the fiber element 300 containing a multitude of multicore fibers 102.

FIGS. 3A-B show block diagrams of an exemplary embodiment of a fiber connector 113 including multiple multicore fibers 102 and that is mechanically aligned and connected to an optical waveguide element 101. The parallel fiber ribbon connector in this exemplary embodiment is based on the popular MT-ferrule (MT—Mechanical Transfer), which incorporates a multitude of multicore fibers 102 in addition to alignment holes 114. In this exemplary embodiment, an adapter element 115 is attached to the waveguide element 101 and aligned relative to the waveguides 103 using alignment marks or studs 116 in x-/y-/z-directions as illustrated in FIG. 3B. The adapter element 115 may include precision pins 117 that fit tightly into the alignment holes 114 of the MT ferrule as shown in FIGS. 3A-B, such that the multicore fibers 102 are translationally aligned in x/y/z-directions to groups of waveguides 103 in the waveguide elements 101.

In additional to proper translational alignment such as described by the exemplary embodiment of FIG. 3A-B, rotational alignment of the multicore fiber 102 may be necessary for coupling light between fiber cores 111 and waveguides 103. In particular, passive alignment is highly desirable in order to enable low-cost connectivity.

FIGS. 4A1-4A3 illustrate exemplary embodiments of multicore fibers 102 with an asymmetry, such as a flange 119 or notch 120, suitable for passive rotational and translational alignment in a fiber connector element 113 with a complementary alignment feature. FIG. 4A1 shows a 4-core fiber, with a D-shape near the end of the fiber that can be passively attached and aligned to a flat surface 119 on a complementary element. FIG. 4A2 shows a 4-core fiber with a notch 120 as asymmetry, and FIG. 4A3 shows a 4-core fiber with a combination of notch 120 and D-flange 119, which may enable higher rotational alignment precision for applications requiring very low coupling loss.

FIG. 4B shows exemplary embodiments of multicore fibers 102 with an asymmetry embedded in a parallel fiber connector element 113, such as a modified MT ferrule. FIG. 4B1 shows rotational and translational alignment of 4-core fibers with a D-shaped flange 119, such as shown in FIG. 4A1, in a modified MT-ferrule with V-grooves 121. FIGS. 4B2 and 4B3 show rotational and translational alignment of 4-core fibers 102 with a D-shaped flange 119 in a modified MT-ferrule with a static or spring-loaded 151 fixture 122. This fixture 122 may be attached to the modified MT-ferrule such as to hold the multicore fibers 102 in place. FIG. 4B4 shows rotational and translational alignment of 4-core fibers having notches 120 and D-shaped flanges 119, such as shown in FIG. 4A3, in a modified MT-ferrule. While FIG. 3B does not explicitly show the passive alignment features of FIG. 4 (illustrating rotational and translational alignment between multicore fibers and MT-ferrule connector), it is understood that the MT-ferrule of FIG. 3B can be replaced in exemplary embodiments by the modified MT-ferrules of FIG. 4B.

FIG. 5 is a block diagram of an exemplary embodiment of a fiber connector with multiple multicore fibers 102 connected to an optical waveguide element 101. One or more lens elements 123 are included for coupling between the multiple multicore fibers 102 and the optical waveguide element 101. This is an exemplary variation of the embodiment illustrated in FIGS. 3A-3B. The addition of lens elements 123 may improve the alignment tolerances of the waveguide 103 to multicore fiber connector 113. Each lens element 123 in this exemplary embodiment has the same number of lenses 123 as there are multicore fibers 102 in the fiber connector 113. Each lens element 123 may have lenses on a single side only or on both sides. One lens element 123 may be attached to or monolithically included in the adapter element 115. One lens element 123 may be attached to or included in the multicore fiber coupling element. Mechanical alignment between the fiber 102 and waveguide elements 103 may achieved in an exemplary embodiment by using pins attached to the adapter on the waveguide element; the pins 117 then mate to corresponding holes 114 on the fiber element.

Figure 6A:
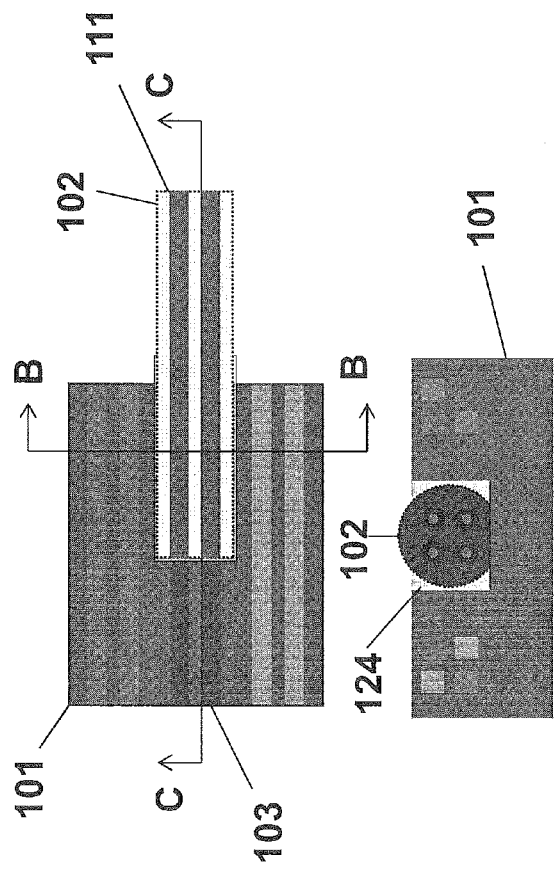
FIG. 6A illustrates an exemplary embodiment of a multicore fiber with a rotational asymmetry that is passively aligned to a waveguide element.
Figure 6B:
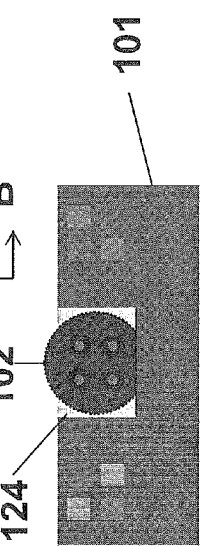
FIG. 6B is a cross-section of the embodiment of FIG. 6A.
Figure 6C:
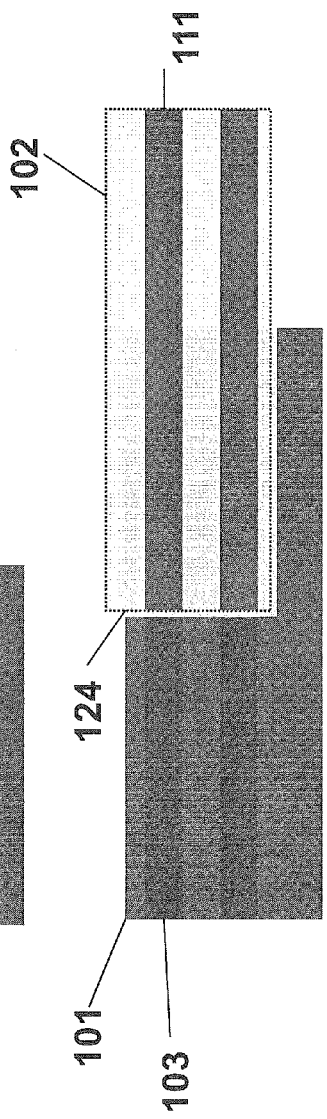
FIG. 6C is another cross-section of the embodiment of FIG. 6A.

FIGS. 6A-C show an exemplary embodiment of a multicore fiber 102 with a rotational asymmetry that is passively aligned and attached to a waveguide element 101. In one example, the waveguide element 101 may be a printed circuit board with polymer waveguide and with a recessed cavity 124. The recessed cavity 124 may be created by using mechanical milling tools. The bottom of the cavity 124 is flat, and its depth and width such that a D-shaped multicore fiber, such as the one of FIG. 4A-(1), can be passively aligned rotationally and translationally in the cavity, enabling light to be coupled between waveguides 103 and the fiber cores 111. The multicore fiber 102 may be permanently attached to the waveguide element using epoxy or mechanical means. While not shown in FIGS. 6A-6C, it is understood that one or more lens elements may be included between waveguides and multicore fiber in some exemplary embodiments.

Figure 7A:
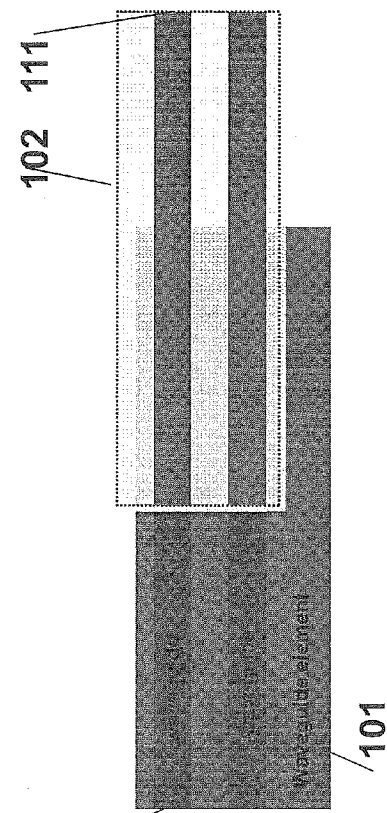
FIGS. 7A-7C show an exemplary embodiment of a multitude of multicore fibers connector with asymmetries that are passively aligned to a waveguide element.
Figure 7B:
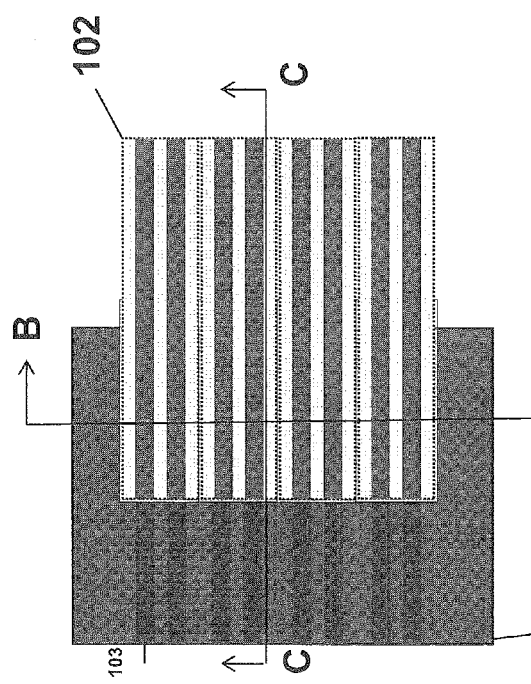
Figure 7C:
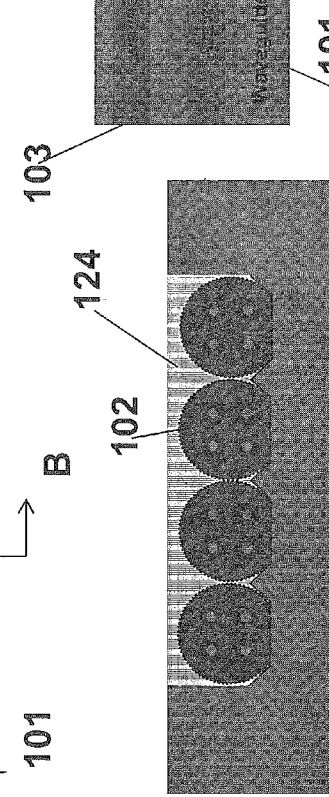

FIGS. 7A-C show an exemplary embodiment of a multitude of multicore fibers 102 with asymmetries that are passively aligned to a waveguide element 101. Processing of the cavity 124, passive alignment and attachment may be identical or similar to those shown in FIGS. 6A-6C.

Figure 8A:
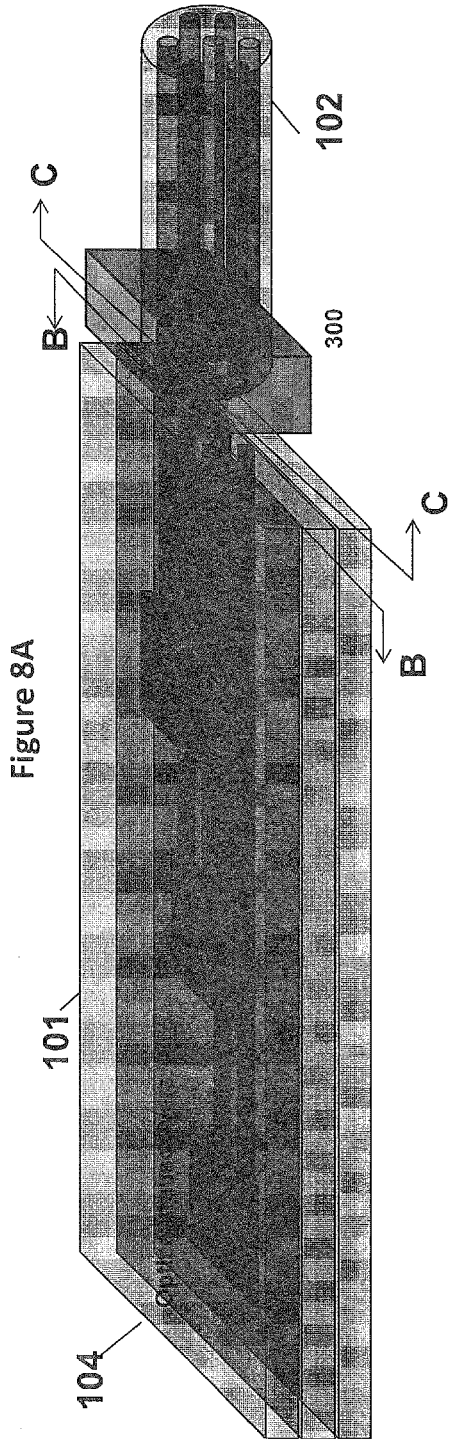
FIGS. 8A-8C show exemplary block diagrams of a fiber element, containing one or more multicore fibers, coupled to an optical element with three layers of optical waveguides.
Figure 8C:
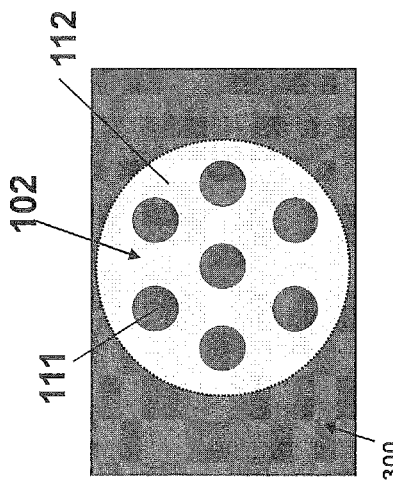
Figure 8B:
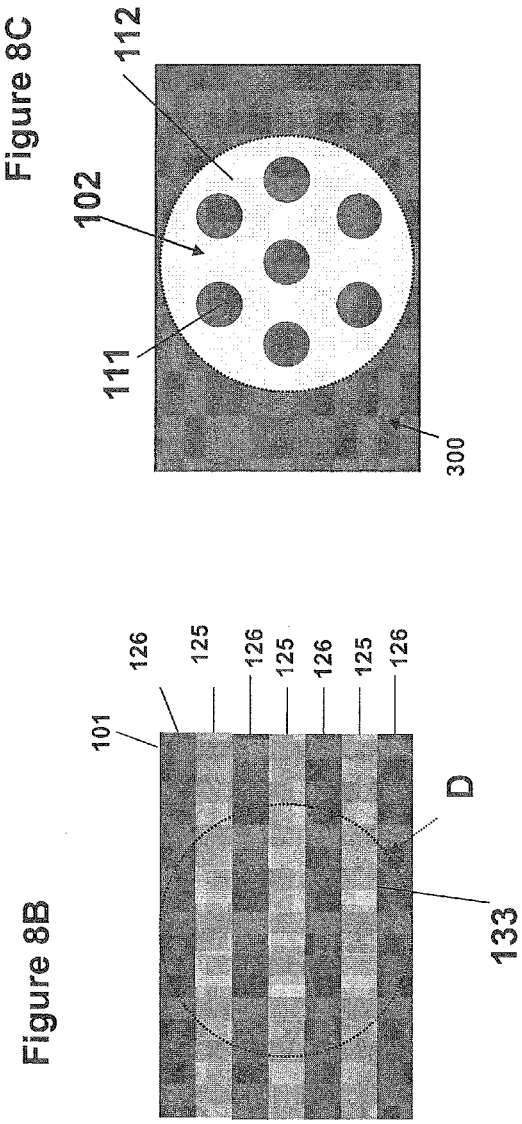

FIGS. 8A-C show block diagrams of a fiber element, containing one or more multicore fibers 102, coupled to an optical element 101 with three layers of optical waveguides 103. In some exemplary embodiments, the waveguide element 101 may be considered as a coupling element between the multicore fiber element 102 and one or more optoelectronic elements 104, such as optical transceivers. The multicore fiber 102 in this embodiment has seven cores 111 embedded in a common fiber cladding 112 of lower refractive index than the refractive indices of the cores 111. The cores 111 in this embodiment as arranged on a regular pattern composed of one center core and six out cores on a hexagonal pattern. The cross section of the fiber in FIG. 8B shows that the fiber can be rotated such that there are three planes of fiber cores: an upper plane with two cores, a middle plane with three cores, and a plane with two cores.

In an exemplary embodiment of FIGS. 8A-8C, the optical waveguide element has three layers of optical waveguides embedded in a polymer substrate, which includes multiple optical core layers 125 and cladding layers 126. The vertical spacing of the core layers 125 in the waveguide element is the same, within fabrication tolerances, as the spacing between layers of cores 111 in the appropriately aligned multicore fiber 102. The multicore fiber 102 is aligned rotationally and translationally to the edge of the waveguide coupling element, such that the fiber cores 111 overlap with corresponding waveguides 103 of the waveguide element. Passive alignment between multicore fiber(s) 102 and waveguide element 101, although not shown explicitly in FIGS. 8A-8C, may be part of some exemplary embodiments, similar as shown in FIGS. 3A-7C.

FIGS. 9A-B illustrate coupling between one or more optoelectronic elements 104 and a multicore fiber element 300 having different pitches, using the waveguide coupling element 101 for pitch conversion. In an exemplary embodiment of FIGS. 9A-9B, 125-um diameter fibers 102 with four cores 111, arranged in a regular 2×2 matrix with 30-um horizontal/vertical pitches are used. Coupling such fibers to the edge of a waveguide element allows for very high escape bandwidth density. However, optoelectronic array elements with such narrow spacings are neither readily available nor are they straight forward to design. A major advantage of using a waveguide coupling element 113 is that the waveguides 103 can be laid out such that optoelectronic arrays with standard pitches, or a multitude of optoelectronic single-channel elements, can be readily used.

An exemplary embodiment of FIGS. 9A-9B uses a 4-channel optical transmitter array 128 on 250-um pitch and a 4-channel optical receiver array on 250-um pitch. The light from the 4 transmitter channels is coupled into four waveguides 103 on one waveguide layer, while light from four waveguides 103 on the second waveguide layer is coupled to the four receiver channels 129. In this exemplary embodiment, turning mirrors 130 in the waveguides are used for out-of-plane coupling between waveguides 103 and optoelectronic elements 104.

An exemplary embodiment using the waveguide coupling element 101 for pitch conversion is shown in FIGS. 10A-B. In this exemplary embodiment a single 4-channel optoelectronic element 104 with a 250-um pitch between the individual devices. Two of the channels are coupled to two waveguides 103 on one waveguide layer, while the other two channels are coupled to two waveguides 103 on the second waveguide layer. In this exemplary embodiment, turning mirrors 130 in the waveguides 103 are used for out-of-plane coupling between waveguides 103 and optoelectronic elements 104. The four waveguides 103 are laid out on the waveguide element and routed to the edge such as to match the pitch of the cores in a multicore fiber 102.

Figure 11:
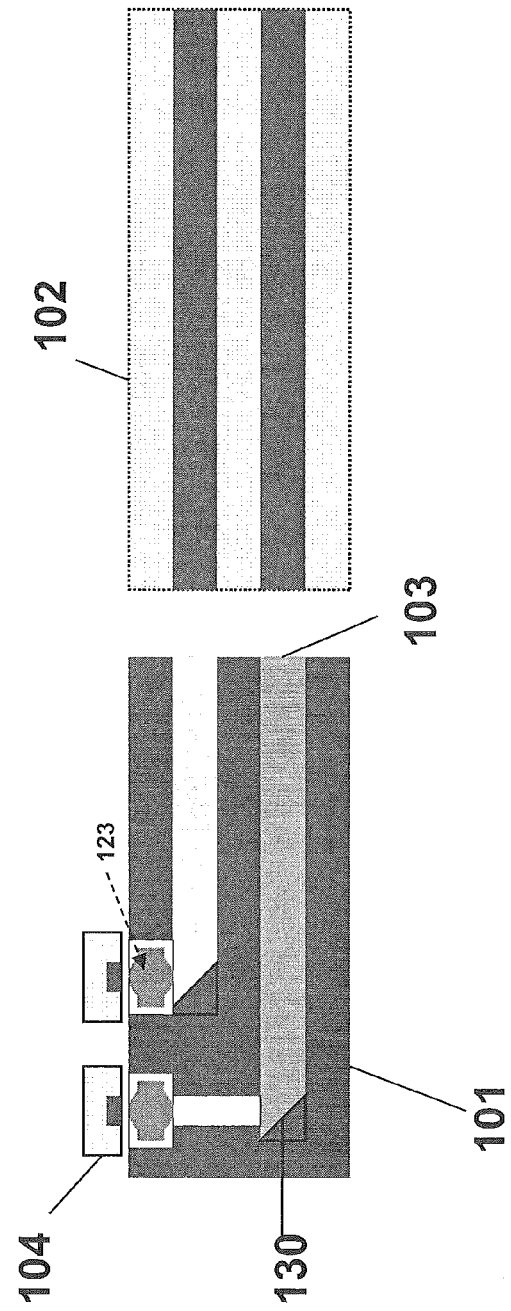
FIG. 11 shows exemplary coupling between one or more optoelectronic elements and a multicore fiber element, using the waveguide element and one or more lens elements for out-of-plane coupling between optoelectronic elements and multicore fibers.

FIG. 11 illustrates coupling between one or more optoelectronic elements 104 and a multicore fiber element 102, using the waveguide element 101 and one or more lens elements 123 for out-of-plane coupling between optoelectronic elements 104 and multicore fibers 102. Using lens elements 123 between optoelectronic elements 104 and waveguides 103 may improve coupling efficiency and alignment tolerances, enabling a simpler and potentially more cost efficient packaging process.

In an exemplary embodiment, the optoelectronic elements 104 are surface-emitting optical transmitters, or surface-illuminated photodetectors, that are flip-chip attached to a printed circuit board with multiple optical waveguide layers. The waveguides 103 on the waveguide element include turning mirrors 130 as shown in FIG. 11, in order to couple light out of plane between waveguides 103 and optoelectronic elements 104. In addition to having lens elements 123 between optoelectronic elements 104 and waveguide element 103, this exemplary embodiment may also include one or more lens elements 123 between waveguide element 103 and multicore fiber element 102, such as shown in FIG. 5.

FIGS. 12A-B illustrate coupling between one or more optoelectronic elements 104 and a multicore fiber element 102, using the waveguide element 101 for in-plane coupling between optoelectronic elements 104 and multicore fibers 102. In exemplary embodiments, one or more lens elements 123 may be used for coupling between the optoelectronic elements 104 and the waveguide element 101. In exemplary embodiments, the optoelectronic elements 104 are edge-emitting optical transmitters or edge-coupled optical waveguide receivers. In an exemplary embodiment, the optoelectronic elements may be flip chip attached in recessed cavities of a printed circuit board with multiple layers of optical waveguides. Some exemplary embodiments may also include one or more lens elements 123 between waveguide element 101 and multicore fiber element 102, such as shown in FIG. 5. Exemplary embodiments may also make use of pitch conversion in the waveguide element 101, as shown in FIGS. 9-10.

Figure 13A:
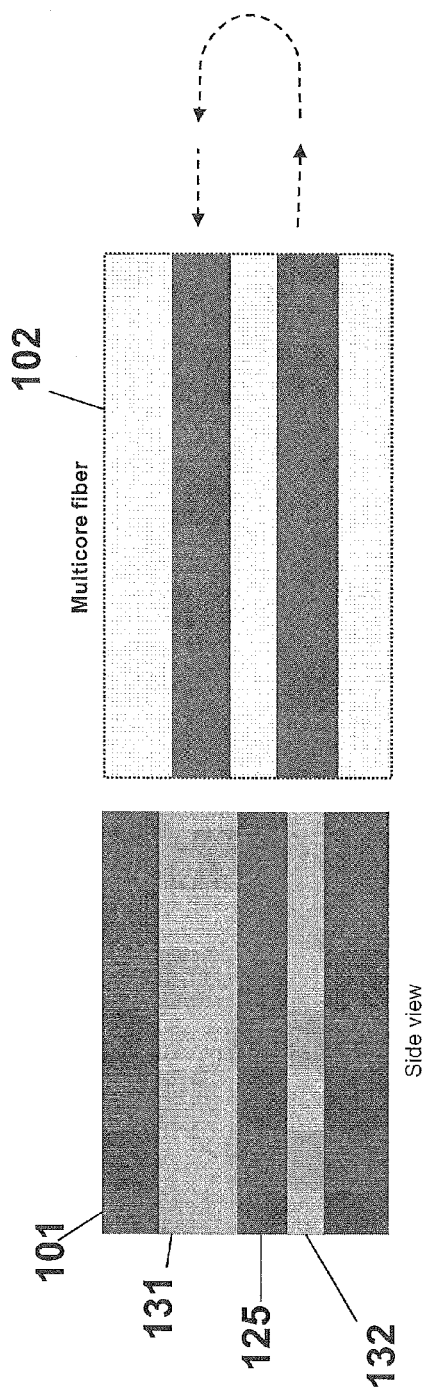
FIGS. 13A-13C show exemplary coupling between a multicore fiber element and a waveguide element with two waveguide layers, where the waveguide layers have different thicknesses.
Figure 13C:
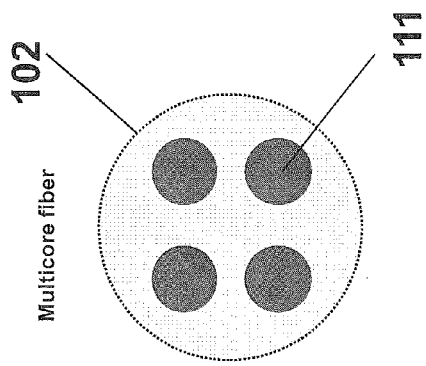
Figure 13B:
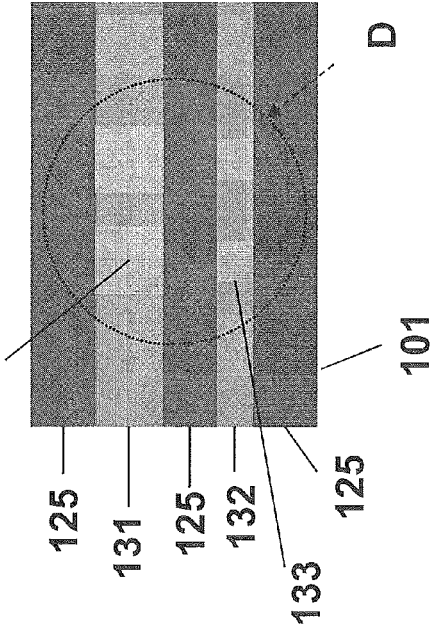

FIGS. 13A-13C illustrate an exemplary coupling between a multicore fiber element 102 and a waveguide element 101 with two waveguide layers, where the waveguide layers have different thicknesses. In an exemplary embodiment, the upper core layer 131, incorporating some optical waveguides 103, is thicker than the lower core layer 132 that incorporates other optical waveguides 103. The spacing between the two waveguide layers is identical to the spacing between two planes of cores 111 in the multicore fiber 102, in order to enable efficient coupling between waveguides 103 and multicore fibers 102.

In one exemplary embodiment of FIGS. 13A-13C, an optical transmitter element may couple into the smaller (lower) waveguide core 133, and the thicker (upper) waveguide core 134 may couple into an optical receiver element. In an exemplary embodiment, the optical transmitter element is a vertical cavity surface emitting laser (VCSEL), and the optical receiver element is a surface illuminated photodiode. In this embodiment, the optical transmitter beam may be smaller than the cross section of the smaller (lower) waveguide, which in turn may be smaller than the core of the multicore fiber 102 it is connected to. In this embodiment, a core of the multicore fiber 102 may be smaller than the thicker (upper) waveguide 103 it couples to, which in turn may have a smaller cross section than the surface illuminated photodetector it connects to.

Using a waveguide element with waveguide layers of different thickness(es) may improve the end-to-end coupling efficiency and alignment tolerances of an optical link comprising VCSEL, waveguide, multicore fiber, waveguide, and photodetector, such as illustrated in FIG. 13A. In fact, VCSELs typically have apertures of less than 10 µm diameter, while surface illuminated photodetectors can have diameters larger than 40 µm while still having bandwidths exceeding 10 GHz. In an exemplary embodiment, the cores 111 of the multicore fiber 102 have diameters on the order of 25-30 µm. In an exemplary embodiment, the lower waveguide core 133 thickness may be between 10-25 µm, while the upper waveguide core 134 thickness may be between 30-40 µm.

Figure 14A:
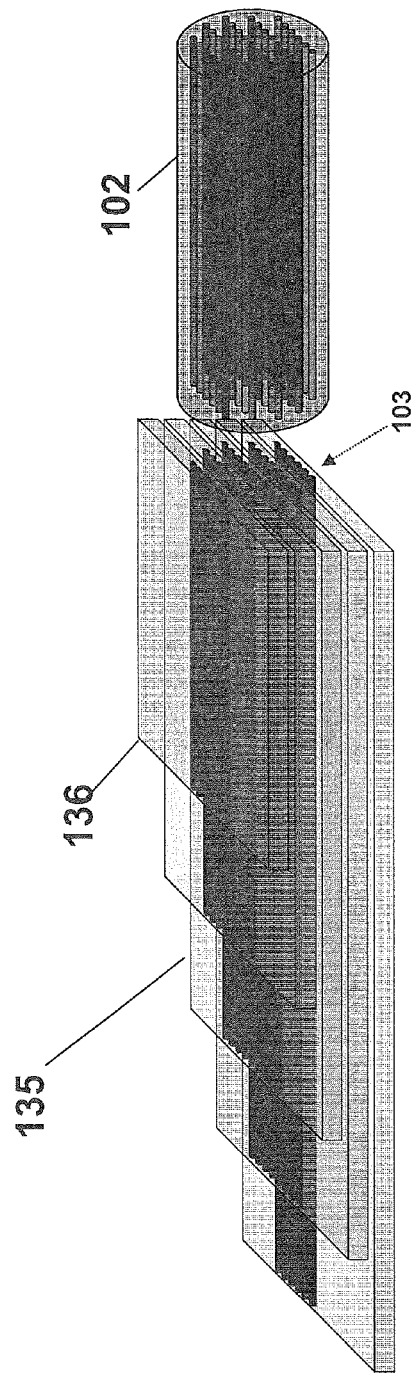
FIGS. 14A-14C show an exemplary embodiment for coupling light between a multicore fiber and three-dimensional chip stack, each chip containing one or more optical waveguides.
Figure 14C:
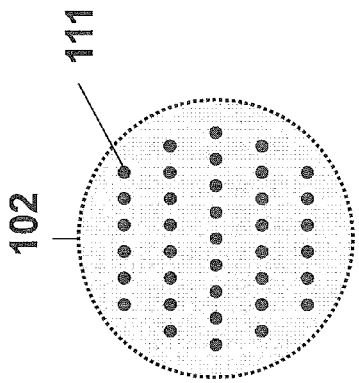
Figure 14B:
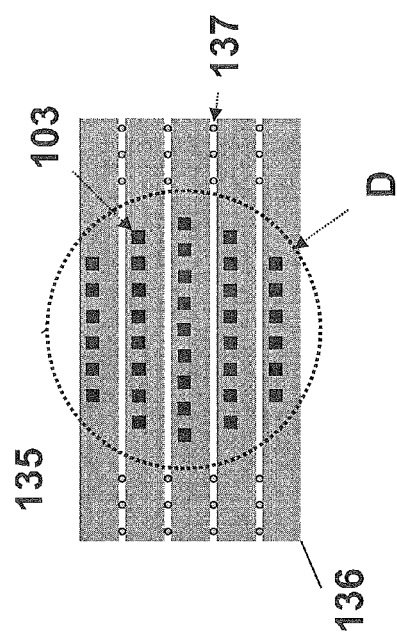

FIGS. 14A-C illustrate an exemplary embodiment for coupling light in plane between a multicore fiber 102 and three-dimensional chip stack 135, each chip 136 containing one or more optical waveguides 103. This is based on single-mode multicore fibers 102 and on semiconductor chips with single-mode optical waveguides 103. An exemplary embodiment uses a stack of Silicon photonic chips with optical waveguides. In exemplary embodiments, Silicon photonic chips can be manufactured using semiconductor-on-insulator (SOI) substrates and CMOS processes.

Single-mode multicore fibers can potentially incorporate many more cores than multimode multicore fibers can, because the single-mode cores can be much smaller and spaced closely together if fibers with appropriate index contrast between cores and cladding are used. An exemplary embodiment illustrated in FIGS. 14A-14C uses a fiber 102 with 37 single-mode cores 111, which is coupled to a stack with five semiconductor chips 136 each incorporating one or more layers of optical waveguides 103. Each semiconductor chip 136 in this embodiment has one or more layers of optical waveguides 103 embedded in a common substrate of lower refractive index. The chip thickness and the spacings between chips in the 3D stack are such that vertical spacing of waveguide layers is the same, within fabrication tolerances, as the spacing between layers of cores 111 in the multicore fiber 102. In exemplary embodiments the chips 136 may be of different size or the same size. In an exemplary embodiment the chips 136 are connected by a chip-to-chip attachment 137.

The multicore fiber 102 can be aligned rotationally and translationally to the edge of the 3D chip stack 135 or to a cavity within the 3D stack, such that the cores 111 of the multicore fiber 102 matches the geometry of and overlaps with a corresponding waveguide array of the 3D stack chip stack.

Figure 15A:
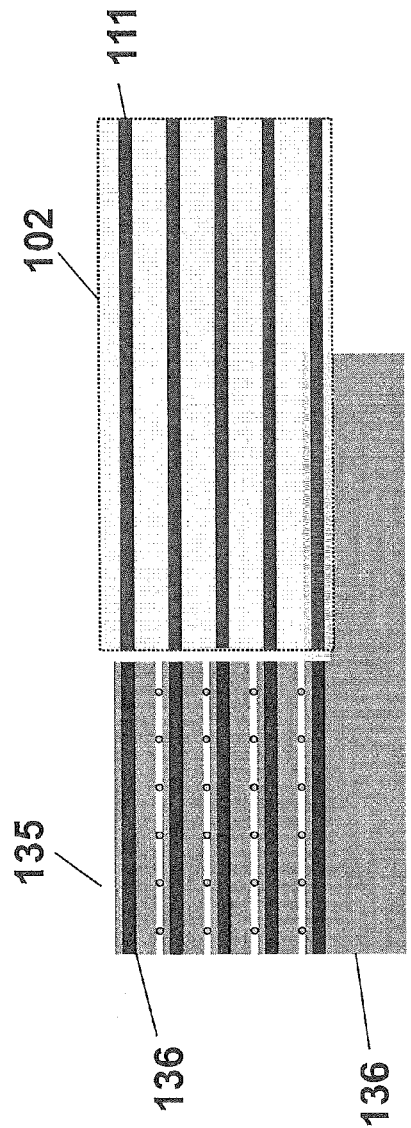
FIGS. 15A-15C show an exemplary embodiment of a multicore fiber with a rotational asymmetry that is passively aligned to a three-dimensional chip stack, each chip containing one or more optical waveguides.
Figure 15C:
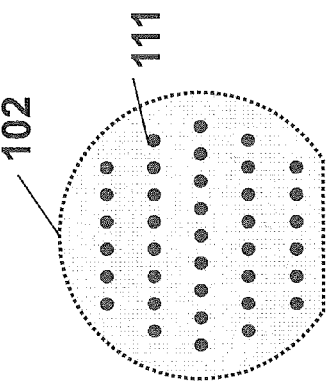
Figure 15B:
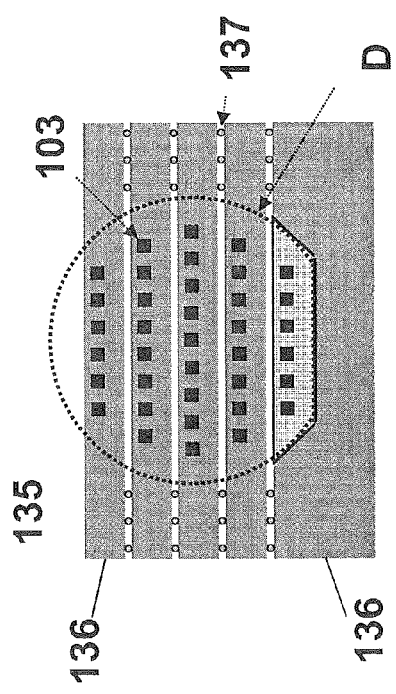

FIGS. 15A-C illustrate an exemplary embodiment of a multicore fiber 102 with a rotational asymmetry, such as an alignment flat, that is passively aligned to a three-dimensional chip stack, each chip containing one or more optical waveguides. Following the alignment, optical light beams can then be coupled between the waveguides 103 and the corresponding cores 111 of the multicore fiber 102. The multicore fiber 102 can have cores 111 arranged on a regular or irregular pattern. The waveguides 103 on the waveguide element 101 can have identical or different spacings in vertical and horizontal directions. The waveguides 103 can be routed arbitrarily on the waveguide element 101, but they should be laid out such that their spacings at the edge of the 3D stack chip stack 135 match the geometry of the cores 111 in the multicore fiber 102. In one exemplary embodiment, the 3D stack chip stack 135 with optical waveguides 103 may be used as an intermediate coupling element to connect one or more optoelectronic elements to one or more multicore fibers 102. Optoelectronic elements in this exemplary embodiment can be discrete devices attached to the 3D stack chip stack 135, or they can be active or passive semiconductor devices monolithically integrated in the chips 136 composing the 3D stack 135. The optoelectronic elements can incorporate electronic chips or circuitry, forming transmitter, receiver or transceiver elements.

Figure 16A:
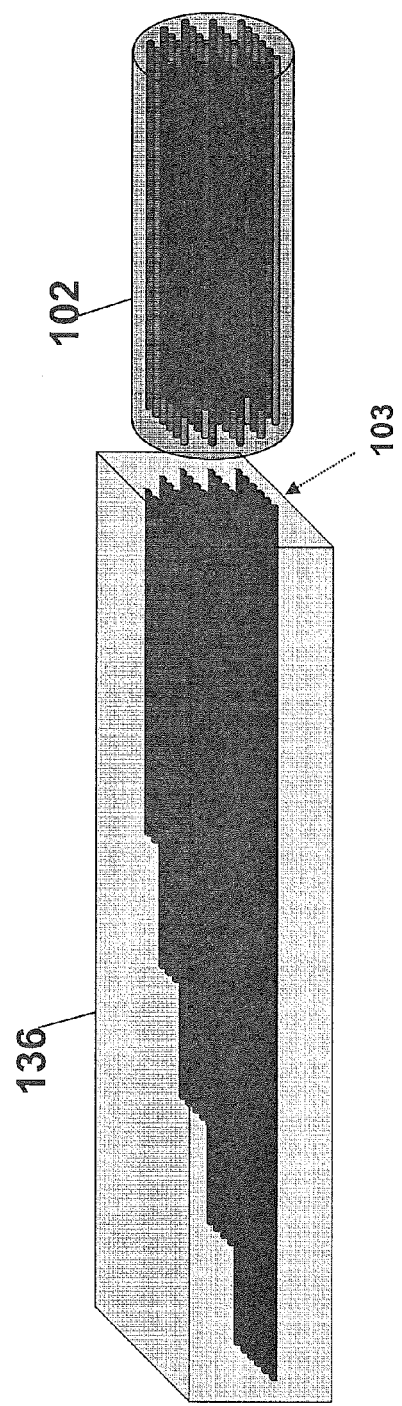
FIGS. 16A-16C show an exemplary embodiment for coupling light between a multicore fiber and a semiconductor chip containing multiple layers of optical waveguides.
Figure 16C:
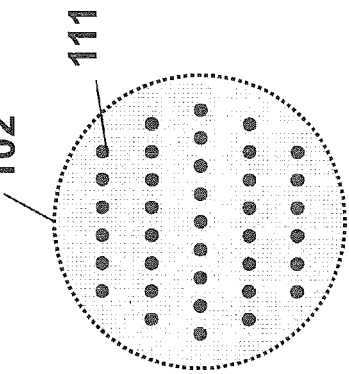
Figure 16B:
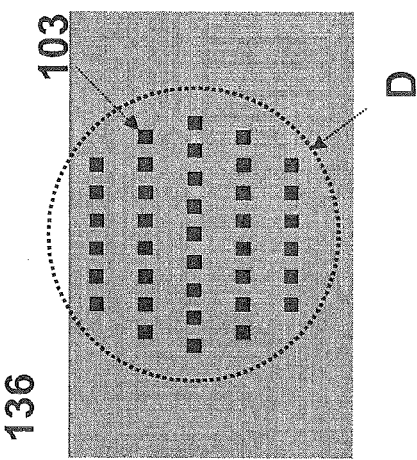
Figure 18B:
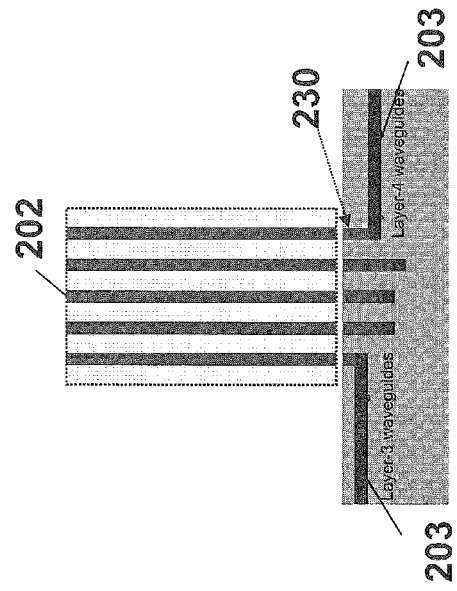
FIGS. 18A-18D show an exemplary embodiment for out-of-plane coupling of light between a multicore fiber and a semiconductor chip containing multiple layers with optical waveguides and grating couplers or turning mirrors.
Figure 18D:
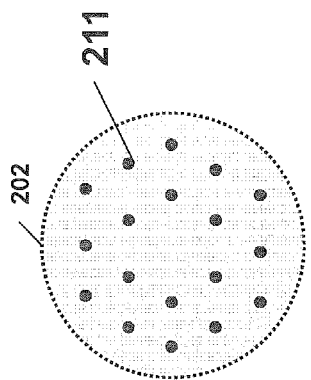
Figure 18A:
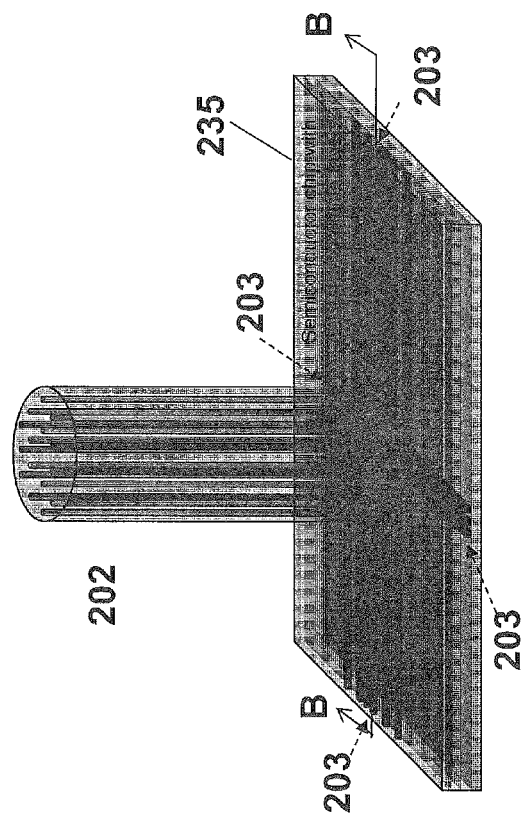
Figure 18C:
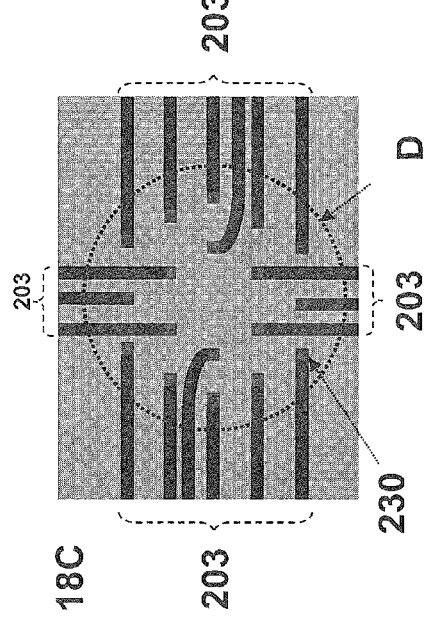

FIGS. 16A-C illustrate an exemplary embodiment for coupling light in plane between a single-mode multicore fiber 102 and a semiconductor chip 136 containing multiple layers of optical waveguides 103. Multicore fiber 102, as well as alignment and coupling means, are largely identical to the descriptions of FIGS. 14A-15B, but the 3D stack chip stack 135 of FIGS. 14A-15B is replaced with a single semiconductor chip 136. Again, the vertical spacings between layers of waveguides 103 need to correspond to the spacings between rows of cores 111 in the multicore fiber 102.

FIGS. 17A-B and 18A-D illustrate out-of-plane coupling between a multicore fiber element 202 and an optical waveguide element 201 with multiple waveguide layers 203. FIGS. 17A-B apply to multimode multicore fiber and waveguides, while FIGS. 18A-C apply to single mode multicore fibers and waveguides.

The exemplary embodiment of FIGS. 17A-17B shows block diagrams of a fiber 202 with four cores 211 and a waveguide element 201 with two layers of optical waveguides 203. The waveguides 203 have turning mirrors 230 to turn the light for out-of-plane coupling. The waveguides 203 and mirrors 230 are placed such that their positions and spacings correspond to the core positions and spacings of the 4-core fiber 202. The multicore fiber 202 may have an asymmetry, such as an alignment flat 119 (not illustrated). Exemplary embodiments of an asymmetry are illustrated in exemplary FIG. 4A. This alignment flat 119 may be aligned with a corresponding feature appropriately placed on the waveguide element 203, to enable passive rotational and translational alignment to the waveguide element 203, such that light can be coupled between the waveguides 203 and the multicore fiber 202. Exemplary embodiments may include one or more lens elements (e.g., see exemplary FIG. 5) between the multicore fiber 202 and waveguide element 201, which may improve coupling efficiency and alignment tolerances. In exemplary embodiments, one or more multicore fiber(s) 202 may be permanently attached to the waveguide element 201. In exemplary embodiments, one or more multicore fiber(s) 202 may be incorporated in a fiber element that may mates and de-mate with the waveguide element 201 using passive alignment means.

FIGS. 18A-D illustrate out-of-plane coupling of light between a single-mode multicore fiber 202 and a semiconductor chip or 3D stack chip stack 235 containing multiple layers with single-mode optical waveguides 203 and grating couplers or turning mirrors 230. The waveguides 203 and turning elements 230 are placed such that their positions correspond to the core spacings of the multicore fiber 202. The multicore fiber 202 may have an asymmetry, for example, an alignment flat. This alignment flat may be aligned with a corresponding feature appropriately placed on the waveguide element 201, to enable passive rotational and translational alignment to the waveguide element 201. Exemplary embodiments may include one or more lens elements between the multicore fiber 202 and waveguide element 201, which may improve coupling efficiency and alignment tolerances. In some embodiments, a lens element may be included in the waveguide element 201. For example lenses may be etched into the surface(s) of one or more semiconductor chip(s) in the waveguide element 201.

While the present disclosure includes descriptions of exemplary embodiments, it will be understood by those skilled in the art that various changes may be made and equivalents may be substituted for elements thereof without departing from the scope of the present disclosure. In addition, many modifications may be made to adapt a particular situation or material to the teachings of the invention without departing from the essential scope thereof. Therefore, it is intended that the present disclosure not be limited to exemplary embodiments, but will include all embodiments falling within the scope of the appended claims.

Further, it is noted that, Applicants' intent is to encompass equivalents of all claim elements, even if amended later during prosecution.

The invention claimed is:

1. An optical connection, comprising:
   a single-element multicore optical fiber having a substantially circular or elliptical cross-section, and including a plurality of cores, each with a substantially circular cross-section, embedded in a common shared cladding material, each core having a higher index of refraction material compared to the common shared cladding material such that light is guided substantially within said cores along the length of the fiber, and where the multiple cores and cladding constitute a single solid entity with no airgaps; and
   an optical waveguide element comprising a plurality of optical waveguides fabricated in one or more layers,
   wherein said optical waveguide element includes a plurality of layers of optically-transparent materials, and
   wherein the plurality of layers include:
      light-guiding materials embedded in a common shared cladding material, each light-guiding material having a higher index of refraction compared to the common shared cladding material; and
      an optical coupling interface, and
   wherein the arrangement of the optical waveguides at the interface is substantially identical to the arrangement of the plurality of cores within the single multicore optical fiber, and such that light guided in each of the cores of the multicore fiber is substantially coupled to and from the corresponding light-guiding waveguides within the optical waveguide element.

2. An optical connection according to claim 1, further comprising a coupling element configured so as to provide passive rotational alignment and translational alignment of the multicore optical fiber with the optical waveguides.

3. An optical connection according to claim 1, further comprising
   an array of multicore optical fibers; and
   an optical element comprising an array of optical waveguides arranged in one or more layers such that a geometry of the optical waveguides matches a geometry of the plurality of cores within the array of the single-element multicore optical fiber.

4. An optical connection according to claim 1, further comprising a coupling means for coupling light between the optical waveguides and the optical fiber based on passive alignment of the fiber element with the optical element.

5. An optical connection according to claim 1, wherein the fiber element is coupled in-plane with the optical element.

6. An optical connection according to claim 1, wherein the fiber element is coupled out-of-plane with the optical element.

7. An optical connection according to claim 6, wherein the fiber element is perpendicular to the optical element.

8. An optical connection according to claim 1, wherein the one or more layers comprise a plurality of chips disposed so as to form a chip stack.

9. An optical connection according to claim 1, wherein the optical element further comprises lenses disposed between the optical waveguides and the optical fiber.

10. An optical connection according to claim 1, wherein the optical element includes an optoelectronic element disposed so as to transmit to an optical waveguide of the optical waveguides.

11. An optical connection according to claim 1, wherein the optical waveguides are disposed on a plurality of vertical layers and a plurality of horizontal layers.

12. A method of coupling a single-element multicore optical fiber element to one or more optoelectronic elements, the method comprising:
   providing the single-element multicore optical fiber having a substantially circular or elliptical cross-section, and incorporating a plurality of cores, each with a substantially circular cross-section, embedded in a common shared cladding material, each core having a higher index of refraction material compared to the common shared cladding material such that light is guided substantially within said cores along the length of the fiber, and where the multiple cores and cladding constitute a single solid entity with no airgaps;
   providing an optical waveguide element comprising a plurality of optical waveguides fabricated in one or more layers,
   coupling the one or more optoelectronic elements with the optical waveguide element; and
   coupling the single-element multicore optical fiber element to the optical waveguide element,
   wherein said optical waveguide element includes a plurality of layers of optically-transparent materials, and
      wherein the plurality of layers include:
         light-guiding materials embedded in a common shared cladding material, each light-guiding material having a higher index of refraction compared to the common shared cladding material; and
         an optical coupling interface, and
      wherein the arrangement of the optical waveguides at the interface is substantially identical to the arrangement of the plurality of cores within the single multicore optical fiber, and such that light guided in each of the cores of the multicore fiber is substantially coupled to and from the corresponding light-guiding waveguides within the optical waveguide element.

* * * * *